United States Patent [19]
Wiggs et al.

[11] Patent Number: 5,671,608
[45] Date of Patent: Sep. 30, 1997

[54] GEOTHERMAL DIRECT EXPANSION HEAT PUMP SYSTEM

[75] Inventors: B. Ryland Wiggs, Franklin; Jack L. Womack, Tullahoma; William C. Bickford, Murfreesboro, all of Tenn.

[73] Assignee: Geothermal Heat Pumps, Inc., Murfreesboro, Tenn.

[21] Appl. No.: 634,868

[22] Filed: Apr. 19, 1996

[51] Int. Cl.$^6$ .................................................. F25D 23/12
[52] U.S. Cl. .................................................. 62/260; 165/45
[58] Field of Search .................................. 62/260, 160, 149, 62/196.1, 208, 228.1, 228.3, 503, 509; 165/45

[56] References Cited

U.S. PATENT DOCUMENTS

| | | | |
|---|---|---|---|
| 4,402,190 | 9/1983 | Reid | 62/178 |
| 4,688,717 | 8/1987 | Jungwirth | 237/2 |
| 4,920,757 | 5/1990 | Gazes et al. | 62/181 |
| 5,025,634 | 6/1991 | Dressler | 62/79 |
| 5,136,855 | 8/1992 | Leanarduzzi | 62/129 |
| 5,224,357 | 7/1993 | Galiyano et al. | 62/260 |
| 5,461,876 | 10/1995 | Dressler | 62/160 |

FOREIGN PATENT DOCUMENTS 3514191  4/1985  Germany.

OTHER PUBLICATIONS

The Trane Company, Trane Reciprocating Refrigeration Manual, 1966; pp. 74–75.
The Goodheart-Wilcox Company, Inc., Modern Refrigeration and Air Conditioning, 1955; pp. 815–816, 822, 108–113.

*Primary Examiner*—William Doerrler
*Attorney, Agent, or Firm*—Waddey & Patterson; I. C. Waddey, Jr.

[57] ABSTRACT

A geothermal direct expansion heat pump system wherein subterranean heat exchange tubes have an internal diameter to length ratio of between 1/4000 and 1/6000, with 5 tubes per ton of BTU capacity; where the interior air heat exchange tubes have 50% of the interior volume of the subterranean tubes; where the thermal expansion valve is sized to match the interior air handler capacity; where the receiver holds 75% to 95% of the total refrigerant volume; where a pump down sequence is employed on system shut down; where an oil trap is installed at the vapor line existing the subterranean heat exchange tubes; and where 4 refrigerant cut-off/isolation valves are installed for service convenience.

11 Claims, 1 Drawing Sheet

GEOTHERMAL DIRECT EXPANSION HEAT PUMP SYSTEM

FIELD OF THE INVENTION

The present invention relates to a direct expansion heating and cooling system utilizing in-ground, refrigerant laden, heat exchange tubing as a primary source of heat transfer.

BACKGROUND OF THE INVENTION

The term "heat pump" is a common and well known name for a heating/cooling system that typically incorporates a phase changing, circulating, refrigerant fluid, such as R-22, to move thermal energy at one temperature in one medium, such as air, earth, or water, to another different medium at another temperature. For example, when a building's interior air is heated or cooled via a conventional air source heat pump, thermal energy (heat) in the outside, or exterior, air is acquired or dissipated via air, fan forced, over finned tubing containing a refrigerant fluid, such as R-22, or the like, in a box termed an exterior heat exchanger. The refrigerant carrying the thermal energy from the exterior air source is transferred by means of a gas compressor to the interior of the building. The thermal energy acquired or dissipated outside is oppositely dissipated or acquired inside the building by means of an interior heat exchanger, which, like the exterior heat exchanger, typically consists of an array of finned, refrigerant laden tubing in a box with a fan (commonly called an air handler) forcing the interior air over the finned tubing to effect heat transfer to or from the interior air. To effect operation of a heat pump system from a heating to a cooling mode, or vice a versa, the directional flow of the refrigerant is simply reversed.

The temperature of the refrigerant on the cooler side heat exchanger must be lower than that of the ambient air on that side, and the temperature on the hotter side must be hotter than the ambient air, in order to effect thermal energy transfer in each case between the air and the refrigerant. The ambient air temperatures on the respective sides may compare unfavorably with the desired direction of thermal transfer. For example, it may be desirable to heat indoor air to above 22° C. (72° F.) when the outdoor air is below that temperature. The heat pump system includes a gas compressor operable to raise the temperature of the refrigerant directed to the hotter side to a temperature greater than the ambient air on the hotter side, and an expander and evaporator to lower the temperature of the refrigerant directed to the cooler side to less than the ambient air on the cooler side. The temperature is stepped down by removing heat and then by lowering the refrigerant pressure, resulting in thermal energy transfer in the desired direction.

The compressor is usually driven by electric power, and constitutes the element which forces the refrigerant around the circulating heat transfer loop between the interior and the exterior of a building. It is also possible to include a pump for circulating refrigerant or water in a system utilizing a liquid fluid that does not change phase. Typically, electrically driven fans are provided to force air over the finned tube heat exchangers so as to reduce the amount of finned tubing necessary to effect the desired thermal transfer between the air and the refrigerant.

The recirculating refrigerant may, and generally does, undergo phase changes as part of the process. At appropriate temperature and pressure, the refrigerant can be boiled (vaporized) on the side of the loop where heat is to be extracted, and condensed back to a liquid on the side to which heat is to be released. The phase change process provides a concentrated and substantial transfer of thermal energy.

Although the idea of a heat pump is to carry thermal energy in the refrigerant at a temperature which is useful for heat transfer in a desired direction via heat exchangers, the thermal transfer efficiency across a heat exchanger is a function of difference in temperature. When the outdoor air temperature is low, it may be necessary to supplement the heat energy obtained from the outside air through the heat pump. Electrical resistance heating means or auxiliary fossil fuel burners or the like can be employed for this purpose. Heat pumps are optimally designed for particular ambient air temperature ranges and their efficiency of heating and/or cooling will be impaired if ambient temperatures occur outside of the heat pump design limits. For example, the efficiency of an air-to-air heat pump used for home heating is reduced at low outdoor temperatures and for home cooling is reduced at high outdoor temperatures.

Heat pumps are designed to operate within a range where it is always possible to achieve cooling, although cooling is not very efficient in hot areas where temperatures often exceed 100° F. On the other hand, for heating, at some minimum outdoor air temperature, the lowest temperature the evaporator can provide is so near to the ambient temperature that little if any heat transfer occurs. At this temperature (which varies with the heat pump but may be on the order of –4° C. or 25° F.), the power expended in running the compressor and an outdoor fan is generally greater than the value of the heat energy available from the outdoor air which is necessary to adequately heat the interior air of the building. In such cases, a controller associated with the heat pump, coupled to an outdoor temperature sensor, shifts the heating system to supplement the heat pump with electric resistive or fossil fuel heating when outdoor temperatures approach the minimum temperature limit, and may disable the heat pump entirely when the minimum temperature limit is reached.

Ground source/water source heat exchange healing/cooling systems typically utilize closed loops of tubing buried in the ground or placed in water, such as a lake. These closed loops may be installed in a variety of manners, including horizontal configurations or helical loops, as well as in vertical configurations usually consisting of elongated U-shaped tubes placed into holes drilled into the earth. These heat exchange loops may carry a water/anti-freeze mixture in a water source system, or a refrigerant in a direct expansion system.

Both water source systems and direct expansion systems utilize naturally occurring geothermal heat as a heat source in the winter and as a heat sink in the summer. In a water source system, water is either taken from, or circulated in, the ground, via coupled plastic tubing and a water pump, so as to effect a thermal heat exchange between the ground and the water. The water is then used to effect a thermal heat exchange with refrigerant in a heat pump system, which refrigerant is utilized to transfer heat to or from interior air, depending on operation in either the heating or cooling mode.

In a direct expansion system, the refrigerant in a heat pump system is circulated directly in the ground, typically via coupled copper tubing, so as to effect a thermal heat exchange with the earth, all absent the additional water heat exchange step inherent with a water source system, and absent the necessity to operate a water pump. The geothermally heated or cooled refrigerant is then utilized by the heat pump system to transfer heat to or from interior air. As a result of the elimination of a heat transfer step, and the elimination of a water pump, direct expansion systems are usually more efficient than water source systems.

Examples of various direct expansion systems are U.S. Pat. No. 4,688,717 to Jungwirth, which primarily operated in a heating mode, and which factually utilized an exterior air source heat exchanger for operation in the cooling mode; U.S. Pat. No. 5,025,634 to Dressler, which utilized a horizontal array of tubing in the ground to effect both heating and cooling mode geothermal heat transfer, which tubing consisted of 5 tubes per ton with an outside diameter to tube length ratio of 1/4800; and U.S. Pat. No. 4,920,757 to Crazes which illustrates the use of an exterior air source heat exchanger, which acted as a receiver, in conjunction with a direct expansion heat transfer tube buffed vertically in the ground in an elongated U shaped manner. U.S. Pat. No. 5,224,357 to Galiyano, Wiggs, et al, disclosed the use of a V shaped fence style installation of direct expansion geothermal heat transfer tubes in a trench, for a direct expansion heat pump system operating in both the heating and cooling mode; and German Patent DE3514191A1 to Waterkote, disclosed the use of direct expansion geothermal heat transfer tubing utilizing internal diameter to length ratios of between 1/2857 and 1/3750. Dressler, in practice, utilized five 100 foot long tubes per ton of heating/cooling load design capacity. Dressler's said ratio, while usually operable, does not alone provide sufficient ground surface area contact for heat transfer in certain areas, such as soils with high silica sand content. On the other hand, Waterkotte's ratio, while providing significantly increased surface area contact, is sized so large that there are disadvantages: in potentially overstressing the adjacent ground's heat transfer ability due to excessive capacity per tube; in potentially requiring too large refrigerant volumes so as to effectively operate in reverse cycle heating/cooling modes absent excessive precautions; and in potentially being too large to adequately maintain sufficient velocity to sweep oil through the system.

In all geothermal heating and cooling systems, installation/operation costs and system operational efficiency levels are of primary importance.

In most direct expansion systems, there are common areas of concern. Such areas of concern include oil return to the compressor, system start up in the cooling mode, subterranean heat exchange tube design, air handler sizing, thermal expansion valve sizing, and system servicing. When a geothermal direct expansion heating/cooling system is utilized, the refrigerant fluid gas compressor lubricant oil typically mixes with the refrigerant fluid and travels throughout the course of the refrigerant fluid heat transfer tubes. The lubricant oil is early carried through the refrigerant fluid conductive tubing back to the said compressor when the refrigerant fluid is in a liquid state, but is not as easily transported when the refrigerant fluid is in a gaseous state. This is an especially worrisome problem when a direct expansion heating/cooling system is utilized because the lubricant oil, typically a mineral oil, may accumulate and become trapped in the submean metal tubing, ultimately resulting in compressor burnout and system failure.

To combat this potential lubricant oil return problem, several methods have been employed in a direct expansion heating/cooling system. One such method has been to utilize relatively small diameter tubing for the subterranean heat transfer tubes transporting the heat transfer refrigerant fluid, so as to increase refrigerant fluid flow velocities to sweep the lubricant oil through the underground tubes back to the compressor. This method has reportedly been utilized and sold by Aardvark Air, Inc., formerly of 7000 Prospect, Kansas City, Mo. 64132, and/or by William Dressler, who has a present business address of 11866 West 91st Street, Overland Park, Kans. 66214, during or about 1982 through 1988 and/or subsequent years; was claimed by Waterkote in German Patent DE 3514191A1; and was claimed by Dressler during or about 1990, in U.S. Pat. No. 5,025,634. Further, in reality, the concept of insuring oil return to a conventional refrigerant compressor by means of utilizing small diameter refrigerant heat transfer fluid tubing, so as to maintain refrigerant fluid velocities sufficient to insure oil return, has been known for many years. For example see the *Trane Reciprocating Refrigeration Manual*, published and copyrighted during or about 1946, by the Trane Company, of LaCrosse, Wis. 54601, as subsequently revised, particularly noting the 1966 revised edition.

Another method employed in a direct expansion system to help insure lubricant oil return to the compressor is to utilize an oil separator, which catches most of the oil and returns it to the compressor before the oil circulates through the subterranean tubing. This basic oil separating concept has also been known in conventional refrigeration systems for many years (see the aforesaid *Trane Reciprocating Refrigeration Manual*, 1966 Edition, et al.), and was installed in direct expansion systems marketed and sold in 1995 by the aforesaid Envirotherm Heating and Cooling, Inc., of Hendersonville, Tenn. 37075. Additionally, the use of an oil separator, when used in a modular tube bundle or in a planar army along the inclined wall of a trench, was disclosed by Galiyano, et al. in U.S. Pat. No. 5,224,357. The use of an oil separator in a direct expansion system was also disclosed by the Applied Energy Research Laboratory of the Mechanical and Aerospace Engineering Department of the North Carolina State University, at Raleigh, N.C. 27695, in AERL Report No. 30, dated Nov. 1, 1985. Further, when refrigerant vapor lines have a vertical rise of about eight feet, or more, the *Trane Reciprocating Refrigeration Manual* discloses the use in a conventional system of an oil trap, but the concept of an oil trap has never been used by direct expansion equipment manufactures. This is historically true in the direct expansion DX industry because the importance of oil return in the vapor line was not appreciated by those in the industry. More specifically, those skilled in the direct expansion art do not consider direct expansion and conventional systems to be comparable and therefore do not normally look to conventional systems for enhancements to direct expansion systems.

Another problem in direct expansion systems occurs during initial system start up. The Dressler system attempts to address this problem by inserting a bleeder port in the heating cycle and cooling cycle metering devices (healing and cooling valves) to equalize system pressure differentials existing after system shutdown. Dressler suggests the bleed ports should consist of 20% to 25% of the surface area of the respective valve. However, a loss of 20% to 25% of the surface area of the respective valves impairs the operational function of each valve.

Dressler also explains that system start up is a problem when the refrigerant fluid loses its momentum upon system shut down, and remains trapped in the subterranean heat exchange tubes, especially during heating cycles where large volumes of refrigerant fluid can accumulate in the underground heat exchange tubes. Dressler explains that the above problem can cause the refrigerant gas compressor to quickly deplete readily available refrigerant gas and to automatically shut down, or cut off, when the system experiences below design compressor operational low pressures, so as to avoid compressor burn-out. To combat this problem, Dressler's system provides for by-passing the designed compressor low pressure cut off switch so as to require the compressor to operate for a series of run times at pressures below operational design, until sufficient refrigerant gas pressure is reached and the system becomes fully operational. However, forcing a refrigerant gas compressor to run for repeated cycles under lower than operational design gas pressure conditions can lead to compressor damage and/or premature compressor failure, all contributing to poor system longevity and/or to lower operational efficiencies.

Finally, Dressler states the refrigerant storage device, which Dressler insulated and termed an accumulator, should store at least 50% of the total volume of refrigerant, reportedly to keep large amounts of liquid refrigerant fluid from flugging the compressor upon system start up during the end of a heating season when the ground may be extremely cold, when large amounts of refrigerant fluid may have migrated to the extremely cold subterranean refrigerant fluid heat transfer tubes.

The use of a receiver in conjunction with a direct expansion system, for the purpose of maintaining a constant supply of refrigerant to an outlet line, together with the use of an accumulator, was disclosed by Jungwirth in 1987 (U.S. Pat. No. 4,688,717). Dressler adopted this concept in U.S. Pat. No. 5,461,876, and claimed a receiver, in a direct expansion system, adapted to store any excess refrigerant when operating in the heating mode, with Dressler explaining the receiver may store approximately 20% of the total quantity of refrigerant. In a similar system, Envirotherm Heating and Cooling, Inc., marketed a direct expansion system in 1995 which contained a receiver device designed to store less than 50% of the total quantity of refrigerant in the system, for purposes of storing excess refrigerant when operating in the heating mode, which is the usual and customary purpose of a receiver in a refrigerant based heating/cooling system. Further, the direct expansion system studied and described by the North Carolina State University AERL, in its Nov. 1, 1985 Report No. 30, utilized a conventional receiver device.

A conventional receiver was reportedly utilized by Aardvark Air, Inc., in direct expansion systems sold during or about 1982, and a conventional receiver was taught in a direct expansion system in a textbook entitled "Modern Refrigeration and Air Conditioning" by Andrew D. Althouse, Carl H. Turnquist, and Alfred F. Bracciano, published by The Goodheart-Willcox Company, Inc., copyright 1975.

Regarding interior air handler sizing, it should be noted that while an over-sized air handler is suggested in U.S. Pat. No. 5,224,357 to Galiyano, et al., the mere use of an oversized air handler alone, absent modulating air handler fan speed, and/or absent modulating or dual compressors, will have no material long term advantage over a wide range of heating/cooling loads where the air handler is appropriately sized in the first instance. Further, how much the air handler is to be oversized is neither taught nor explained, rendering the unexplained idea, in and of itself, useless. For example, a 50 ton air handler installed in a one ton direct expansion system would create too large of opposing heat exchange mismatching, resulting in an exceedingly large healing/cooling charge imbalance and system operational short cycling.

It is known that, for enhanced direct expansion system operational efficiencies, the total interior volume areas of the heat exchange tubes contained within the interior air heat exchanger should ideally match, or approximately be equivalent to, the total interior volume area of an exterior air heat exchanger in an air source heat pump, or of exterior subterranean heat exchange tubes in a direct expansion heat pump. This is not the case, however, in any of the presently known direct expansion systems, where the total interior volume area of the exterior, subterranean heat exchange tubes is significantly larger than the total interior volume area of the heat exchange tubes within the respective system's air handler.

Generally, in existing direct expansion systems, the total interior volume area is larger in the exterior ground tubes than in the interior air handler tubes because the subterranean tubes must typically effect heat transfer via thermal contact with the soil alone, absent the benefit of finned tubing and a fan, such as are found in the typical air handler. The soil temperature, although relatively stable, will vary from season to season, consequently, more tubing is required in the ground alone, so as to provide a sufficient opposite effect heat transfer with the condensed, fan assisted, interior air handler, which typically returns only relatively stable temperature interior air. This is one of the major contributing factors to the charge imbalance, and the need for a receiver and/or accumulator storage, as conventionally used with direct expansion systems, because the subterranean ground coils, when acting as the condenser in the summer, require a greater refrigerant volume to effectively operate than does the interior air handler, when acting as the condenser in the winter. However, too great a refrigerant volume differential between the subterranean ground coils and interior air handler coils will result in operational inefficiencies and potential inability to reverse cycle, in one of either the healing or the cooling mode, depending on which heat exchange coils are oversized in an excessive amount.

Further, with conventional direct expansion geothermal systems, subterranean heat exchangers are typically designed to match compressor sizing. Likewise, the air handler size is typically determined to match compressor sizing, which compressor size is usually determined via ACCA Manual J load calculations, or other similar criteria.

Where the volume area of the submean ground coils is greater than the volume area of the interior air handler heat exchanger tubes, other primary ratios critical to high efficiency system operation have heretofore been overlooked, such as the total interior volume area of the subterranean heat exchange tubes in the ground versus the total interior volume area of the indoor heat exchange tubes in the air handler, together with a proportionately sized compressor and a proportionately sized air handler fan.

Examples of prior art would be the Dressler system, as basically described in the U.S. Pat. No. 5,025,634, and the Envirotherm Healing and Cooling, Inc. systems referred to above.

In the Dressler system, there was no discussion or disclosure regarding interior volume areas of heat exchange tubes, in relation to proportionately sized compressors and air handlers. However, the Dressler system typically utilized five, ¼ inch O.D., ACR grade, 100 foot long, subterranean heat exchange tubes, which had an approximate total interior volume area of 170 cubic inches; together with an air handler with an approximate total interior volume area of 131 cubic inches; all per ton of compressor capacity and all per 400 cfm to 450 cfm of indoor air The Envirotherm system used five, ¼ inch O.D., ACR grade, 120 foot long, subterranean heat exchange tubes, which have an approximate total interior volume area of 203 cubic inches; together with an air handler with an approximate total interior volume area of 131 cubic inches; all per ton of compressor capacity and all per 400 cfm to 450 cfm of indoor air handler fan capacity. USPower Climate Control, Inc. sold direct expansion systems utilizing six ¼ inch O.D., ACR grade, 100 foot long, subterranean heat exchange tubes, with an approximate total interior volume area of 203 cubic inches, together with an air handler and cfm per ton of system capacity, just as Envirotherm has marketed.

Thus, the Dressler system had a ground tube volume to air handler volume ratio of about 1.3 to 1, with a 400 cfm to 450 cfm air handler fan capacity, per ton of system compressor capacity. The Envirotherm and certain USPower Climate Control systems have a ground tube volume to air handler volume ratio of about 1.5 to 1, with a 400 cfm to 450 cfm air handler fan capacity, per ton of system compressor capacity.

As background on thermal expansion valves, a thermal expansion valve, also called a thermostatic expansion valve, regulates the refrigerant flow by maintaining a relatively constant superheat at the evaporator outlet by increasing the refrigerant flow as the superheat at the evaporator outlet rises, due to an increase in heat load on the evaporator, and by means of decreasing the refrigerant flow as the superheat at the evaporator outlet lowers, due to a decrease in heat load on the evaporator. Typically, a thermal expansion valve is sized to match the conventionally sized compressor.

Lastly, with respect to system servicing and repair in existing systems, service personnel typically evacuate the refrigerant from a direct expansion system prior to performing service work involving a refrigerant containment component. After completing the service work, the direct expansion system must be recharged with refrigerant. This process of refrigerant evacuation and recharging is time consuming.

SUMMARY OF THE INVENTION

A geothermal direct expansion heat pump system wherein subterranean heat exchange tubes have an internal diameter to length ratio of between 1/4000 and 1/6000, with 5 tubes per ton of BTU capacity; where the interior air heat exchange tubes have approximately 50% of the interior volume of the subterranean tubes; where the thermal expansion valve is sized to match the interior (as opposed to the exterior) air handler capacity; where the receiver holds 75% to 95% of the total refrigerant volume; where a pump down sequence is employed on system shut down; where an oil trap is installed at the vapor line existing the subterranean heat exchange tubes; and where 4 refrigerant cut-off/isolation valves are installed for service convenience.

BRIEF OF DESCRIPTION OF THE DRAWINGS

FIG. 1 is an schematic view of a simple version of a direct expansion geothermal heat pump system, operating in a heating mode, including ground heat exchange tubes, interior air heat exchange coils, a fan, ducting, an oil trap, a thermal expansion valve, a compressor, an accumulator, a receiver, and refrigerant isolation valves. Valving customarily used for reversing the refrigerant flow from the heating mode to a cooling mode is not shown since the design of such valving is well known by those in the refrigeration trade.

DETAILED DESCRIPTION OF THE PREFERRED EMBODIMENTS

Figure 1:
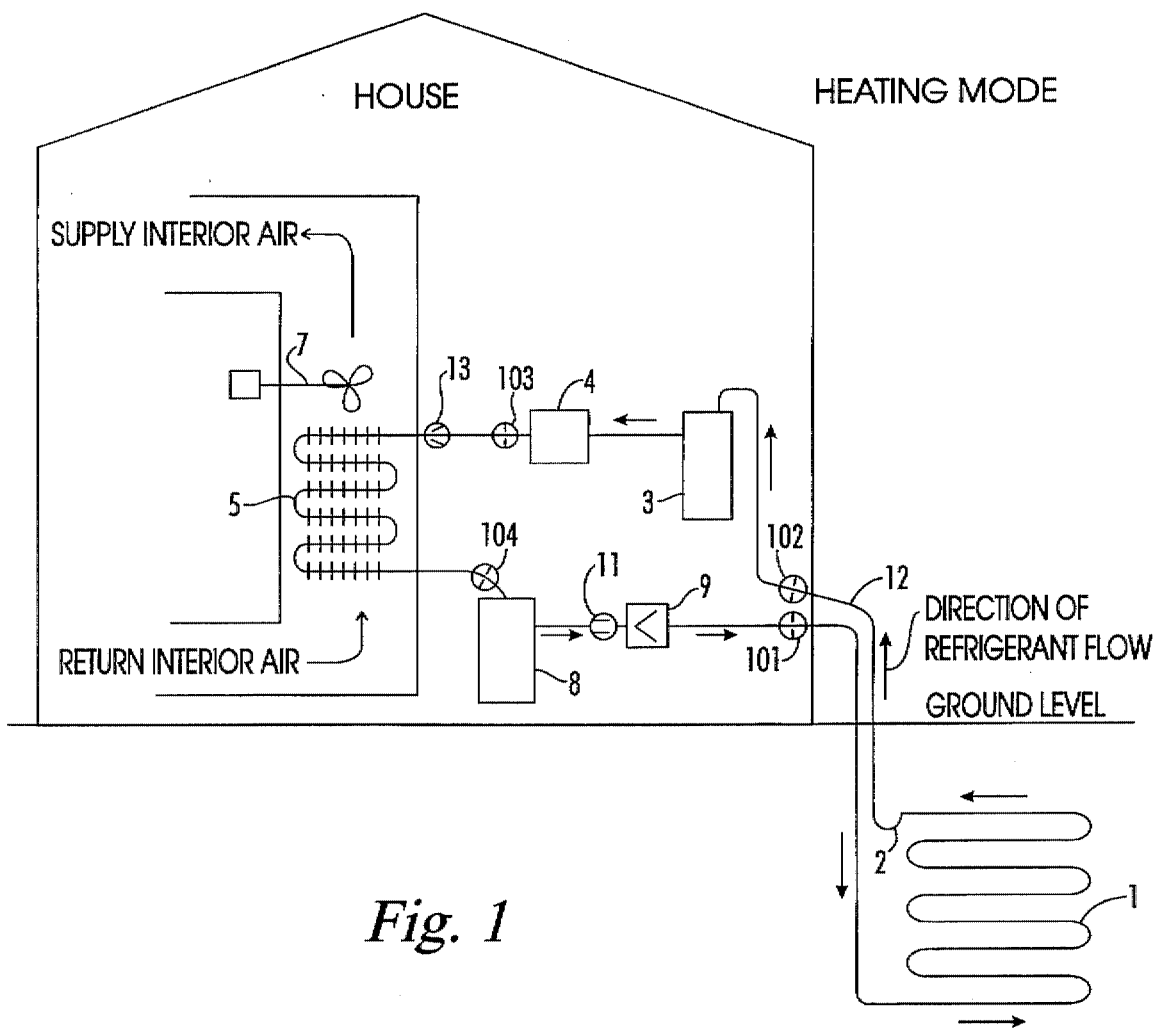

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawing.

Referring now to the drawing in detail, where like numerals refer to like parts or elements, there is shown in FIG. 1 a simple version of a direct expansion geothermal heat pump system, operating in a healing mode.

A refrigerant fluid is passed through the ground heat exchange tubing 1 where thermal energy (heat) of the earth, conducted to the fluid through the tubing, evaporates the fluid into a gas. A pump from any convenient manufacturer forces the vaporized refrigerant to travel through an oil trap 2, to an accumulator 3, such as accumulator Model HX3700, manufactured by Refrigeration Research, Inc. of Brighton, Mich. and into the suction line of the refrigerant compressor 4.

The refrigerant gas is compressed by the compressor 4, thus raising its temperature, and next travels into the interior air heat exchange coils 5, enclosed within air ducting 6, where heat is transferred to interior air as air handler fan 7 blows interior air from the house over fins provided to facilitate the heat transfer process.

As the heat is removed from the refrigerant in the interior air heat exchange coils 5, via the fan 7 circulating interior air over the coils, the refrigerant fluid condenses into a liquid and next travels through a receiver 8, which automatically supplies the proper amount of refrigerant to the overall system. The supplementation of refrigerant is based on the refrigerant condensing point which in turn is based on the heat load in the interior air heat exchange coils 5 or the ground heat exchange tubing, depending on the season and cycle of the system. In the winter the interior air heat exchange coils 5 do not withdraw as much refrigerant from the receiver 8 as the ground heat exchange tubing withdraws in the summer, when acting as a condenser, due to the significantly smaller interior volume area of the ground heat exchange tubing 1 as compared to the heat exchange coils 5.

Thereafter, the refrigerant fluid travels through a thermal expansion valve 9, such as Model BRIVE-4-GAY manufactured by Sporlan Valve Co. of St. Louis, Mo., where the refrigerant fluid's pressure and temperature are reduced, and then into the ground heat exchange tubes 1, where the process is repeated until enough heat is transferred from the earth to the interior air to satisfy the thermostat (not shown), which, when satisfied, turns off the system.

Oil trap 2, having a small U shaped bend, is placed at a location, or locations, in the hot gas line, with the trap's lower bottom horizontal dimension kept to a minimum. The primary purpose of the oil trap 2 is to start the compressor lubricant oil rising and returning to the compressor when carried along by a refrigerant fluid gas within a refrigerant fluid conductive tubing. However, the oil trap may also be used to prevent oil from draining back to the compressor 4 when the heating/cooling system is turned off, and may also be used to collect oil drained from an evaporator and the evaporator suction connection. The oil trap 2 is placed at the lowest point where the return refrigerant gas fluid tube first exits the underground distributor, when the system is operated in the heating mode.

An oil trap should also be installed just beyond the compressor, or just beyond the receiver when a receiver is utilized, at the base point of a vertical rise of eight feet (8') or more up to the interior air heat exchange unit (air handler) when the direct expansion system is operated in the cooling mode, where the interior air handler acts as the refrigerant vaporizer.

Further, whether operating in the heating or cooling mode, an additional oil trap should be added to the gas, or vapor, refrigerant fluid transfer tube for each additional twenty five feet (25') of vertical rise.

The present system addresses the problem of system start up and provides a method to more efficiently combat the aforesaid problems of equalizing system pressure differentials occurring after direct expansion system shutdown, and of below design refrigerant gas pressure conditions which may exist upon system start-up in the winter, when the bulk of the refrigerant within the system has naturally migrated to the coldest point, namely, the extremely cold ground area. Pursuant to the present invention, both of the aforesaid problems are resolved by utilizing a "pump down" system.

Our pump down system includes a receiver 8, such as a Refrigeration Research receiver, Model 3413, capable of holding approximately between 50% and 95% of the total refrigerant fluid within the entire system. Receiver 8 is located at a point between the condenser and the thermal expansion device. In our "pump down" system, the refrigerant compressor is programmed to continue to operate after the thermostat is satisfied until the compressor shuts off, via a low-pressure safety switch. The compressor's internal low pressure switch because when the thermostat is satisfied, a signal is simultaneously sent to activate and close a solenoid valve 11. The solenoid valve is located in the refrigerant fluid transfer tube at a point on the exit side of the receiver 8, and prior to the thermal expansion device 9. A check valve is placed in the refrigerant fluid transfer tube 12, between the compressor 4 and the reversing valve, thereby preventing significant refrigerant migration back into and/or through the refrigerant compressor 4. The receiver must always be located at a point after the condenser, in both heating and cooling modes, and prior to the self-adjusting thermal expansion device 9, in both heating and cooling modes.

In our system, when the compressor 4 shuts off in response to low pressure sensed by the internal pressure switch, the bulk of the refrigerant is stored in the receiver 8. This structure eliminates the pressure differentials on each side of the compressor 4 which may inhibit system start up, thus eliminating the need for Dressler's 20% to 25% bleed port in heating and cooling valves, as specifically disclosed in 5,025,634 and 5,461,876, and also eliminating the need for by-pass refrigerant lines as reportedly utilized by Aardvark Air, Inc. since about 1982. Further, since the bulk of the system's refrigerant is stored in the receiver 8, the bulk of the refrigerant is prevented, via a check valve 13 and closed solenoid valve 11, from migrating to, and condensing in, the coldest areas of the heat exchange coils. This design eliminates the need to force the compressor to run at a level of operation below its low pressure cut off point for extended periods, as previously required of the Dressler system. Upon system start up, the solenoid valve 11 is programmed to open approximately one minute prior to compressor start up, so as to eliminate the low pressure conditions in the refrigerant conductive tubing in the ground and entering the compressor.

The subterranean heat exchange refrigerant tube is designed with an internal diameter to length of the heat exchange tube ratio in a range between 1/4000 and 1/6000, with a preferred ratio being 1/4752, with five (5) tubes per ton of conventionally sized compressor capacity. Geothermal heat transfer refrigerant tube designed within said ratios between 1/4000 and 1/6000 are small enough to entrain and move compressor lubricant oil, but are large enough to provide enhanced ground surface area contact and enhanced heat transfer capacity over the smaller 1/4800 (outside diameter) Dressler ratio. Testing has demonstrated that, for a direct expansion system, significantly enhanced system operational efficiencies, of about 20 percent or more, can be achieved by using a ground tube volume to air handler volume ratio of 2 to 1, plus or minus ten percent, with a 450 to 550 cfm interior air handler fan capacity, per ton of conventionally sized system compressor capacity, in conjunction with the 1/4,000 to 1/6,000 internal diameter to length ground tube milo with 5 tubes per ton of conventionally sized compressor capacity. All of the above subterranean tube volume to air handler volume ratios utilize unfinned ground heat exchange tubes, and utilize standard finned air handler tubes with 12 fins per inch.

For high operational efficiencies, adhering to this design criteria, the submean ground coils should be sized, in conjunction with the 1/4,000 to 1/6,000 internal diameter to length of ground tube ratio, to match the compressor size, which compressor should be sized in accordance with ACCA Manual J or similar, load calculations, but the air handler coil volume sizing should be sized to match the ground coil volume area, not to match the compressor size. This design results in an interior volume ratio of between 2 to 1 and 3 to 1, especially when the ¼ inch I.D. ground coil tubing is utilized. Additionally, for high operational efficiencies, the thermal expansion device, commonly called a TX valve, utilized in a direct expansion system, should be sized, based on its tonnage (BTLD capacity ratings where one ton equals 12,000 BTUs, to match the capacity of the interior air handler, sized as disclosed herein.

Lastly, so as to enhance ease of servicing a direct expansion system incorporating a large capacity receiver, four manually operable shut off/service valves 101, 102, 103, and 104 are installed within the system's interconnecting refrigerant tubing. The valves, such as shut off/service valves model HX3700, manufactured by Aeroquip of Maumee, Ohio, will reduce system operational servicing costs by totally eliminating the need for both refrigerant reclamation before servicing work, and for refrigerant recharging after servicing work.

The isolation of the systems refrigeration charge is accomplished as follows: One isolation valve 101 is located between the expansion valve 9 and the ground heat exchange tubing 1. A second isolation valve 102 is located between the oil trap 2 and the accumulator 3. A third isolation valve 103 is located between the compressor 4 and the cheek valve 13. The fourth isolation valve 104 is located between the interior air heat exchange coils 5 and the receiver 8.

A solenoid valve 11 is placed in the refrigerant fluid line 12, at a point between the receiver 8 and the thermal expansion valve 9. The system also includes a check valve 13, which is located in the refrigerant fluid line 12, at a point between the compressor 4 and the interior air heat exchange cobs 5. The solenoid valve 11 and the check valve 13 enable the refrigerant to be retained in the receiver 8 upon system pump down because with these valves closed to the directional flow of the pumped refrigerant, the only place for the refrigerant to be stored is in the receiver 8. This enables the refrigerant to be isolated within the interior portion of the equipment upon system shut down, during the pump down mode, and prevents refrigerant migration to the cool area in the subterranean ground coils, which could otherwise result in system start up problems caused by the compressor having to pull significant mounts of stationary liquid refrigerant out of the ground against the force of gravity. In a reverse cycle system (not shown) the check valve 13 would be located between the compressor 4 and a reversing valve (not shown). Operation in a reverse cycle is not shown, being readily understood by those in the trades and being demonstrated in the aforesaid U.S. Pat. No. 5,025,634, and in U.S. Pat. No. 4,402,190.

The present invention teaches how to significantly enhance operational efficiencies in both the heating and cooling modes in a reverse cycle, geothermal, direct expansion, heating/cooling system. These results are achieved by using a variety of enhancements, which, either singularly or in combination, result in an operational direct expansion system of substantially improved efficiencies.

What we claim is:

1. A geothermal direct expansion heat pump system, including subterranean heat exchange tubes, an accumulator, a compressor, interior air heat exchange tubes, a receiver, and a thermal expansion valve, and tubing connecting them in series, said tubing carrying a refrigerant through said system, wherein the subterranean heat transfer tubes have an internal diameter to length ratio between 1/4,000 and 1/6,000, with 5 tubes per ton of compressor BTU capacity.

2. The geothermal direct expansion heat pump system of claim 1, wherein the interior air heat exchange tubes contain an interior volume area which is fifty percent, plus or minus ten percent, of the interior volume area of the subterranean heat exchange tubes.

3. The geothermal direct expansion heat pump system of claim 1, wherein the thermal expansion valve is sized to match the BTU size capacity of the interior air heat exchange tubes.

4. The geothermal direct expansion heat pump system of claim 1, wherein the receiver is sized to hold between 75% and 95% of the total volume of refrigerant within the system.

5. The geothermal direct expansion heat pump system of claim 1 further including a thermostat which, upon sensing a predetermined temperature, sends a signal to shut off said compressor, and a low-pressure switch, and wherein said compressor is programmed ignore the signal from the thermostat and to continue to operate until the compressor is shut off in response to activation of said low-pressure safety switch.

6. The geothermal direct expansion heat pump system of claim 5 further including a solenoid located in the refrigerant fluid transfer tube at a point on the exit side of the receiver, and prior to the thermal expansion device, and a one way refrigerant flow check valve located at a point just beyond the compressor discharge, but prior to any reversing valve, and wherein said solenoid is closed by a signal from said thermostat upon said thermostat sensing said predetermined temperature, thereby causing the bulk of the refrigerant to be pumped into the receiver and prevented from migrating back through the compressor by means of said check valve.

7. The geothermal direct expansion heat pump of claim 1, wherein a U-shaped oil trap is installed at the point where the vapor line exits the subterranean heat exchange tubes.

8. The geothermal direct expansion heat pump of claim 1, wherein four manually operable refrigerant cut-off/isolation valves are installed, for service work purposes, within the system's interconnecting refrigerant tubing, with the valves respectively located: (1) on the suction line entering the compressor unit, between the accumulator and the subterranean ground tubing, (2) on the liquid line existing the thermal expansion valve, prior to entering the subterranean ground tubing, (3) on the hot gas discharge line exiting the compressor unit, prior to the interior heat exchange (air handler) unit, and (4) on the liquid line exiting the interior heat exchange (air handler) unit, prior to entering the receiver.

9. A geothermal direct expansion heat pump system, including subterranean heat exchange tubes, an accumulator, a compressor, interior air heat exchange tubes, a receiver, and a thermal expansion valve, and tubing connecting them in series, said tubing carrying a refrigerant through said system, wherein the interior air heat exchange tubes contain an interior volume area which is fifty percent, plus or minus ten percent, of the interior volume area of the subterranean heat exchange tubes.

10. A geothermal direct expansion heat pump system, including subterranean heat exchange tubes, an accumulator, a compressor, interior air heat exchange tubes, a receiver, and a thermal expansion valve, and tubing connecting them in series, said tubing carrying a refrigerant through said system, and a thermostat which, upon sensing a predetermined temperature, sends a signal to shut off said compressor, and a low-pressure switch, and wherein said compressor is programmed ignore the signal from the thermostat and to continue to operate until the compressor is shut off in response to activation of said low-pressure safety switch.

11. The geothermal direct expansion heat pump system of claim 2, wherein the receiver is sized to hold between 75% and 95% of the total volume of refrigerant within the system.

* * * * *